United States Patent
Reckzeh et al.

(10) Patent No.: US 9,272,772 B2
(45) Date of Patent: Mar. 1, 2016

(54) SURFACE ELEMENT FOR AN AIRCRAFT, AIRCRAFT AND METHOD FOR IMPROVING HIGH-LIFT GENERATION ON A SURFACE ELEMENT

(71) Applicant: Airbus Operations GmbH, Hamburg (DE)

(72) Inventors: Daniel Reckzeh, Stuhr (DE); Burkhard Goelling, Buchholz i.d.N. (DE); Matthias Lengers, Bremen (DE)

(73) Assignee: Airbus Operations GmbH (DE)

( * ) Notice: Subject to any disclaimer, the term of this patent is extended or adjusted under 35 U.S.C. 154(b) by 356 days.

(21) Appl. No.: 13/850,414

(22) Filed: Mar. 26, 2013

(65) Prior Publication Data

US 2014/0061387 A1  Mar. 6, 2014

Related U.S. Application Data

(60) Provisional application No. 61/617,174, filed on Mar. 29, 2012.

(30) Foreign Application Priority Data

Mar. 29, 2012  (EP) .................................. 12162149

(51) Int. Cl.
  *B64C 21/04* (2006.01)
  *B64C 21/02* (2006.01)
  *B64C 9/24* (2006.01)
  *B64C 21/06* (2006.01)
(52) U.S. Cl.
  CPC ................. *B64C 21/025* (2013.01); *B64C 9/24* (2013.01); *B64C 21/02* (2013.01); *B64C 21/04* (2013.01); *B64C 21/06* (2013.01); *Y02T 50/166* (2013.01); *Y02T 50/32* (2013.01)

(58) Field of Classification Search
  None
  See application file for complete search history.

(56) References Cited

U.S. PATENT DOCUMENTS

| | | |
|---|---|---|
| 1,775,757 A | 9/1930 | Gay |
| 2,477,461 A | 7/1949 | Lee |

(Continued)

FOREIGN PATENT DOCUMENTS

| | | |
|---|---|---|
| CN | 101348170 A | 1/2009 |
| CN | 101896401 A | 11/2010 |

(Continued)

OTHER PUBLICATIONS

EP 12 162 156.9 Action (Jun. 11, 2014).

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

A surface element, e.g. a wing, of an aircraft includes a leading edge, a high lift device arrangement positioned along the leading edge and at least one add-on body positioned in a leading edge region, wherein the high lift device arrangement is interrupted in the region of at least one add-on body for preventing collision with the add-on body and wherein the surface element includes an arrangement of openings in a region covering the add-on body, which openings are connected to an air conveying device for conveying air through the openings. Thereby an additional flap for harmonizing the flow above a pylon or other add-on body can be eliminated.

11 Claims, 3 Drawing Sheets

(56) References Cited

U.S. PATENT DOCUMENTS

| | | | |
|---|---|---|---|
| 3,025,026 A | 3/1962 | Nichols | |
| 3,058,695 A * | 10/1962 | Simonis | 244/207 |
| 3,090,584 A * | 5/1963 | Kuchemann et al. | 244/199.1 |
| 3,097,817 A * | 7/1963 | Towzey, Jr. | 244/15 |
| 3,142,457 A | 7/1964 | Quenzler | |
| 3,319,593 A | 5/1967 | Papst | |
| 3,891,163 A | 6/1975 | Wilkerson et al. | |
| 3,920,203 A | 11/1975 | Moorehead | |
| 3,936,013 A * | 2/1976 | Yuan | 244/199.3 |
| 3,951,360 A | 4/1976 | Anxionnaz | |
| 3,974,986 A * | 8/1976 | Johnstone | 244/199.3 |
| 4,099,691 A | 7/1978 | Swanson et al. | |
| 4,169,567 A | 10/1979 | Tamura | |
| 4,214,722 A | 7/1980 | Tamura | |
| 4,285,482 A | 8/1981 | Lewis | |
| 4,382,569 A * | 5/1983 | Boppe et al. | 244/199.4 |
| 4,477,042 A * | 10/1984 | Griswold, II | 244/199.2 |
| 4,666,104 A * | 5/1987 | Kelber | 244/12.1 |
| 5,039,032 A * | 8/1991 | Rudolph | 244/35 R |
| 5,150,859 A | 9/1992 | Ransick | |
| 5,158,251 A | 10/1992 | Taylor | |
| 5,263,667 A * | 11/1993 | Horstman | 244/209 |
| 5,590,854 A * | 1/1997 | Shatz | 244/206 |
| 5,687,934 A | 11/1997 | Owens | |
| 5,803,409 A * | 9/1998 | Keefe | 244/206 |
| 5,803,410 A * | 9/1998 | Hwang | 244/208 |
| 5,813,625 A | 9/1998 | Hassan et al. | |
| 5,884,873 A * | 3/1999 | Breit | 244/209 |
| 5,899,416 A * | 5/1999 | Meister et al. | 244/207 |
| 6,109,565 A | 8/2000 | King, Sr. | |
| 6,135,395 A * | 10/2000 | Collett | 244/209 |
| 6,216,982 B1 | 4/2001 | Pfennig et al. | |
| 6,234,751 B1 | 5/2001 | Hassan et al. | |
| 6,622,973 B2 * | 9/2003 | Al-Garni et al. | 244/206 |
| 6,752,358 B1 * | 6/2004 | Williams et al. | 244/208 |
| 6,892,989 B1 * | 5/2005 | Whitmore et al. | 244/200 |
| 7,004,094 B2 * | 2/2006 | Carson | 114/67 A |
| 7,152,829 B2 * | 12/2006 | Bertolotti | 244/209 |
| 7,637,462 B2 | 12/2009 | Pal | |
| 7,735,782 B2 * | 6/2010 | Kloker et al. | 244/209 |
| 7,766,280 B2 * | 8/2010 | Cloft et al. | 244/208 |
| 7,850,126 B2 * | 12/2010 | Crouch et al. | 244/200 |
| 7,866,609 B2 * | 1/2011 | Parikh | 244/209 |
| 8,033,510 B2 | 10/2011 | Shmilovich et al. | |
| 8,251,319 B2 | 8/2012 | Jonker et al. | |
| 8,382,043 B1 | 2/2013 | Raghu | |
| 8,573,542 B2 | 11/2013 | Brown | |
| 8,651,813 B2 | 2/2014 | Long | |
| 8,844,264 B2 * | 9/2014 | Khalid | 60/226.1 |
| 8,864,082 B2 * | 10/2014 | Syassen | 244/209 |
| 2007/0051855 A1 * | 3/2007 | Shmilovich et al. | 244/207 |
| 2007/0084297 A1 * | 4/2007 | Powell | 73/861 |
| 2009/0230251 A1 * | 9/2009 | Bonnaud et al. | 244/198 |
| 2010/0104436 A1 | 4/2010 | Herr et al. | |
| 2010/0115820 A1 | 5/2010 | Perevoshchikov et al. | |
| 2010/0176249 A1 * | 7/2010 | Schwetzler | 244/199.1 |
| 2010/0219296 A1 | 9/2010 | Shelman-Cohen | |
| 2010/0294891 A1 * | 11/2010 | Kelm | 244/199.4 |
| 2010/0303634 A1 | 12/2010 | Long | |
| 2012/0045329 A1 | 2/2012 | Smith et al. | |
| 2013/0153711 A1 | 6/2013 | Wooden et al. | |
| 2013/0284273 A1 | 10/2013 | Boespflug et al. | |
| 2013/0291981 A1 | 11/2013 | Lengers et al. | |

FOREIGN PATENT DOCUMENTS

| | | |
|---|---|---|
| EP | 0532093 A1 | 3/1993 |
| EP | 2167380 A1 | 3/2010 |
| WO | 2009098442 A2 | 8/2009 |

OTHER PUBLICATIONS

Chinese Office Action (CN 201310104991.3)—Jan. 7, 2015.

European Office Action for Application No. 12162156.9 dated Mar. 13, 2015.

* cited by examiner

SURFACE ELEMENT FOR AN AIRCRAFT, AIRCRAFT AND METHOD FOR IMPROVING HIGH-LIFT GENERATION ON A SURFACE ELEMENT

CROSS-REFERENCE TO RELATED APPLICATIONS

This application claims the benefit of the filing date of European Patent Application No. 12 162 149.4 filed Mar. 29, 2012 and of U.S. Provisional Patent Application No. 61/617, 174 filed Mar. 29, 2012, the disclosure of which applications is hereby incorporated herein by reference.

TECHNICAL FIELD

The invention relates to a surface element for an aircraft, an aircraft and a method for improving high lift generation on a surface element.

BACKGROUND OF THE INVENTION

Commercial aircraft usually comprise wing-mounted engines. For civil use turbofan engines with a high bypass ratio are preferred as they provide a low thrust specific fuel consumption, wherein by enlarging the diameter of a fan section, the bypass ratio of a turbofan engine can be increased. Hence, on one hand, for better fuel efficiency the radial extension of turbofan engines is to be increased and on the other hand the preferred mounting position under a wing strongly limits the maximum possible diameter of an engine as the length of the landing gear may not exceed a certain length due to weight restrictions, the possible shock absorption characteristics and resizing effects of the main landing gear on the overall configuration of the aircraft. Consequently, for some configuration the engine will be mounted closely to the wing.

A support structure is usually employed for mounting an engine to a wing, which support structure is faired by a pylon extending from an engine nacelle to the underside of the wing near its leading edge. Along the leading edge commercial aircraft usually comprise an arrangement of extendable high lift devices, e.g. one or more of a variety of different possible leading edge high lift devices comprising slats, Krueger devices, droop nose devices etc., that allow an increase especially of the maximum lift in low speed flight regimes generated by the wing. In a leading edge region that is close to the pylon of the support structure the extension of a high lift surface element is geometrically spanwise limited, due to the sweep angle of the wing and the vertical distance between the leading edge high lift device and a nacelle or engine cowling. Therefore, a slat arrangement is interrupted such that a collision with the pylon and the engine are avoided. In order to at least partially recover the aerodynamic penalty due to this interruption, there are different solutions known in the state of the art.

One solution is directed to a Krüger flap which is installed e.g. in the area inboard of the engine pylon. The advantage of the Krüger flap is that a smaller deployment room is needed compared to that of a conventional slat. However, even though its deployment room is small, for extremely closely coupled engines it might still be too large. Another disadvantage is that it relies on a complex kinematic system that requires frequent maintenance.

Another known solution is to introduce strakes as passive devices, which strakes create a trailing vortex that delays the stall in the region of the slat interruption. The strake vortices are created in the time when the overall aircraft exceeds a certain angle of attack. Nevertheless, as the strakes are usually fixed, they create unwanted drag before this angle of attack is reached.

EP 2 167 380 A1 discloses a nacelle of a wing mounted engine comprising several fin-shaped vortex generators on one side of the nacelle for improving the maximum lift.

BRIEF SUMMARY OF THE INVENTION

An aspect of the invention proposes a surface element that is adapted for effectively producing high lift essentially without aerodynamic penalties due to a span wise shortened or interrupted leading edge high lift device.

The surface element for an aircraft according to an embodiment of the present invention comprises a leading edge, a movable high lift device arrangement positioned along a leading edge of the surface element and at least one add-on body positioned in a leading edge region, wherein the high lift device arrangement is interrupted in the region of the at least one add-on body for preventing collision with the add-on body, wherein the surface element comprises an arrangement of openings in a region covering the add-on body, which openings are connected to an air conveying device for conveying air.

The surface element described above may exemplarily be based on a typical wing of a commercial aircraft that has a movable high lift device arrangement along the leading edge and an add-on body, for example an aerodynamic pylon that acts as a fairing around the support structure of an aircraft engine, the aircraft engine itself, tanks, fueling pods or military equipment, wherein the surface element is modified with a flow control arrangement in a region where the high lift device arrangement has to be interrupted for avoiding any structural damage during the use of the high lift devices. In this region of interest any lift is solely generated by the surface element downstream of the interruption. When the high lift devices are deployed the flow characteristics and geometric limitations of the adjacent end faces of the interrupted slat arrangement disturb the lift generation as it becomes inharmonic due to the creation of highly three-dimensional vortical structures in the wake of the end faces. The occurring suction peak of the unprotected surface element is significantly higher in comparison to leading edge regions without a leading edge high lift device, therefore a higher recompression and higher danger of flow separation occurs. Critical flow features coming from separated regions or close to separation regions on the engine cowling may further affect this region. Further, an inharmonic lift distribution due to spanwise high lift device reduction is present.

The introduction of openings in this region of interest enables the harmonization of the flow characteristics by sucking off or blowing out air, e.g. by injecting transonic or supersonic jet momentum fluid, for equalizing the flow energy compared to the flow downstream of the high lift devices. For exciting vortex phenomena that also reduce or eliminate separation, sucking off and/or blowing out air or a timely variation of both or one of them may be accomplished. Hence, pulsed blowing, pulsed blowing and suction as well as pulsed suction and all transitions between both may be realized. As such a local flow control does not depend on a flap or other deployable aerodynamic surface in the region of the leading edge of the surface element above an add-on body it is possible to further decrease the distance of the engine to the leading edge without resulting in degraded aerodynamics or a more complex surface element. The installment of the active flow control device is internal to the surface element and does not require any deployment room. Consequently, this leads to a fuel burn efficiency increase since to a certain point the engine diameter correlates with the fuel efficiency. Additionally and due to the internal installation, it hardly creates drag in off-design scenarios.

It has to be considered that the degradation of high lift generation is also depending on more complex, three-dimensional flow phenomena arising from local flow around the adjacent end faces of leading edge high lift devices facing the interruption. Further, the flow around the add-on body also influences the local flow. For the exact positioning, extension and number of openings it is considered helpful to conduct a CFD analysis and high Reynolds number wind tunnel testing or even flight tests.

Besides being realized as a wing, a surface element may also be any other body that has a leading edge extending from a fuselage into the flow.

For the sake of clarity and completeness it is pointed out that a variety of different flow states may be used by the local flow control as explained above. First of all a steady blowing may take place through at least a section or all of the openings, meaning that a source of compressed air is steadily connected to the openings and therefore air is constantly delivered through the openings into the environment. Secondly, a steady suction may take place through at least a section or all of the openings, meaning that a pressure sink is steadily connected to the openings and therefore air is constantly sucked through the openings into the wing structure. Thirdly, steady blowing in a certain section of the wing and at the same time steady suction in another section of the wing may take place, e.g. depending on the stagnation line separating an upper and a lower part of the wing. Also, a timely varied blowing including regulation of the flow from void to maximum as well as a timely varied suction including regulation of the flow from void to a maximum may be possible. Lastly, suction and blowing may be applied in at least a section of the wing in an alternating manner.

In an advantageous embodiment the add-on body is an engine pylon which is fairing of a support structure of the aircraft engine that interrupts the leading edge high lift device arrangement.

In a further advantageous embodiment the arrangement of openings are positioned in a region covering a stagnation line of the surface element. Generally speaking, on conventional wings as surface element the stagnation point may be found close to the region where the surface element has its maximum curvature, wherein the stagnation line moves more on the lower side of the wing the higher the angle of attack increases. Due to the pressure rise at the downstream side of the suction peak separation may occur. The higher the peak (the lower the pressure) the higher the pressure increases downstream of the peak, hence, it is more likely that the flow downstream of the peak is tending to separate. By influencing the local flow through means of introducing air into or sucking off air off the region of interest in and downstream of the high lift device interruption the separation is shifted to higher angle of attacks, or to overall incident angles, for which other areas of the wing separate. As the actual position of the stagnation point depends on the characteristics of the surface element profile the openings may be positioned on the upper side of the surface element, the lower side of the surface element or may extend from the lower side of the surface element to its upper side.

In an advantageous embodiment the openings may be selected from a group of openings, the group comprising at least one bore hole, at least one slit introduced into the surface of the surface element in a direction, which is parallel to the leading edge, at least one slit introduced into the surface of the surface element in a direction, which is normal to the leading edge, and at least one slit introduced into the surface of the surface element in a direction, which is at an angle to the leading edge. Thereby, an optimal arrangement of openings may be selected or compiled that considers the flow characteristics of the actual aircraft. It is not necessary that all openings are of the same shape or the same diameter, the arrangement may also be compiled with different openings and with different diameters or shapes as the actual local flow characteristics may require.

In a still further advantageous embodiment the surface element comprises a front spar onto which a nose element is attached, wherein the openings extend into the front spar or are connected to an air line in the front spar. The front spar may comprise or define at least a part of the duct and may further encase the air conveying device. Thereby, the front spar may act as a manifold for connecting a plurality of openings to a single air conveying device.

In an advantageous embodiment, the conveying device is adapted for sucking off air through the openings. Thereby, the generation of vortices may be reduced or eliminated as excess air accumulating in the region of interest covering the high lift device arrangement interruption can be reduced. This leads to a harmonization of the local flow and thus to an improved generation of high lift.

Alternatively, depending on the local flow characteristics, the air conveying device may also be adapted for blowing out air through the openings. Thereby, the local flow energy may be increased, leading to increased local flow velocity and thereby delaying local stall or other flow separation phenomena. For this purpose the conveying device may be realized by various different devices. For example, if an already present source of compressed air may be used inside the aircraft, the air conveying device may be a valve or any other fluidic device that is adapted to switch on or off the air flow through the openings. Additionally, such a valve or other fluidic device may also be adapted to control or regulate the pressure of the compressed air that is lead to the openings, wherein the air conveying device may advantageously be connected to a control unit that is enabled to control the valve settings.

In an advantageous embodiment the air conveying device is connected to a compressed air line and is connectable to the openings in a fluidic manner. The compressed air line may be connectable to a source of compressed air inside the aircraft, such as a compressor of an electrical environmental control system, a pack of a bleed air driven environmental control system, a ram air inlet or a bleed air port itself.

In an advantageous embodiment the air conveying device is connected to a suction air line and is connectable to the openings in a fluidic manner. The suction air line may be connectable to a pressure sink such as an inlet of a fan, a venturi nozzle or other means that are adapted for applying pressure to the suction air line which is lower than the pressure at the openings.

In a still further advantageous embodiment, the conveying device is realized as a compressor that is in fluidic connection to the openings for independently compressing air for blowing out air through the openings. The compressor may be of any suitable kind of compressor, including fans. This may enable a rather compact integration of a local flow control device in the region of the high lift device interruption as no additional ducts or other devices for leading compressed air through the aircraft to this region are necessary.

In a still further embodiment the air conveying device is connected to an air sucking device and is connectable to the openings in a fluidic manner. Such an air conveying device may also be realized as a fan wherein a suction port or air inlet is connectable to the openings. This enables air to be sucked off in the interruption region covering the add-on body for decreasing the vorticity of the air flow and delaying the stall of the flow.

In a still further embodiment the air conveying device is adapted for blowing out and/or sucking off air through the openings in an alternating manner. This can relate to a synthetic jet apparatus. This may either be accomplished by alternatingly connecting a compressed air line or a suction line to the openings, by connecting an air conveying device for blowing and another air conveying device for sucking off to the openings. Alternatively a piston arrangement, such as a cylinder comprising a piston which is movably supported therein, may be connectable to the openings. As further alternatives electromagnetic drivers and piezoelectric drivers may be used. The operating frequency may in general exceed 1 Hz and may reach up to some hundred Hz, depending on the size of the individual openings. By the synthetic jet, vortices may be excited that prevent or reduce the flow separation phenomena.

In a further advantageous embodiment, the arrangement of openings extends for up to 20% of the surface element span to each side of the add-on body. Thereby, an efficient local flow control is accomplished as the local flow characteristics induced by the interruption of the high lift device arrangement are substantially present in this area.

In a further improved embodiment, the region covering the interruption of the high lift device arrangement extends for up to 30% of the surface element root chord from the leading edge to the trailing edge. This limits the local flow control to a region that is required for optimally affecting the local flow characteristics.

Another aspect of the invention relates to an aircraft comprising at least one surface element with a high lift device arrangement and at least one wing mounted engine. The at least one wing may be realized as the surface element described above. Furthermore, the aircraft may comprise a source of compressed air, e.g. a component of an environmental control system, a bleed air port of the at least one wing mounted engine, a ram air inlet or other means. The use of a bleed air port may be advantageous as the distance from the engine to the arrangement of openings is quite short. For preventing temperatures that exceed a maximum allowable temperature for the wing structure due to its material properties either a cooler may be used for cooling bleed air routed to an environmental control system or other means or it may be possible to introduce an additional bleed air port that delivers bleed air with a lower temperature, e.g. in one of the first two compressor stages.

Still further, an aspect of the invention relates to a method for improving the high-lift generation of a surface element by basically accomplishing the step of conveying air through an arrangement of openings situated in a region covering an add-on body on a wing when leading edge high lift devices are extended.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, irrespective of their composition in the individual claims or their interrelationships. Furthermore, identical or similar components in the figures have the same reference characters.

DETAILED DESCRIPTION

Figure 1A:
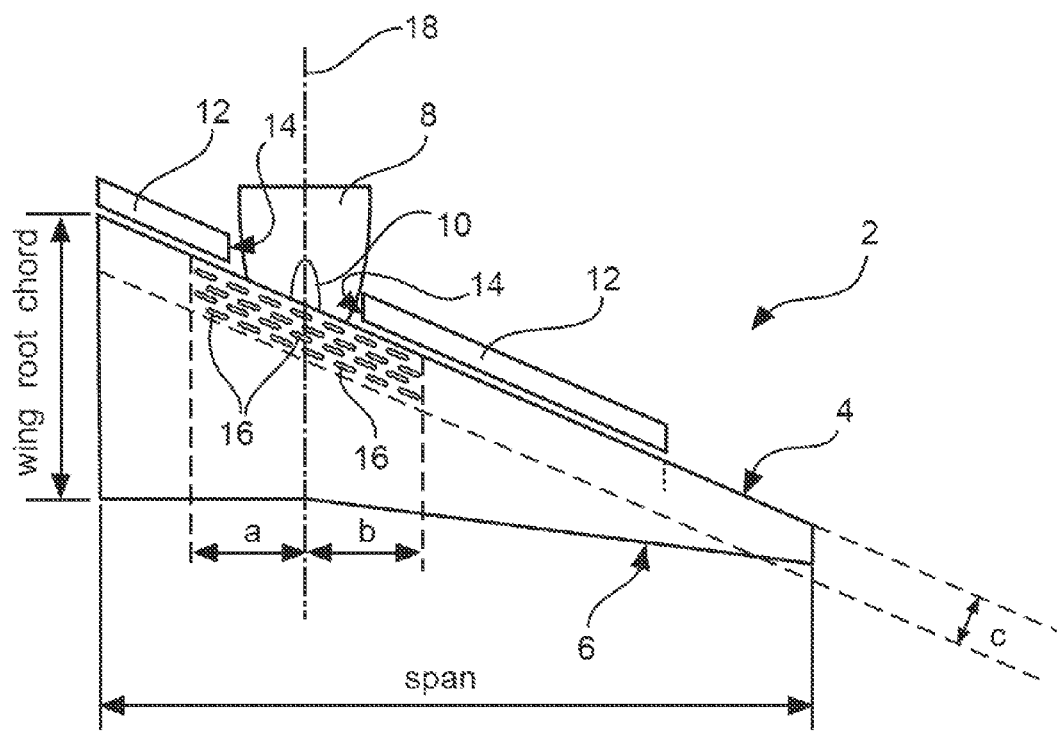
FIG. 1a and 1b show the wing according to the invention in two different schematic views.

FIG. 1a shows a schematic view on a wing 2 as a surface element according to the invention. The wing 2 as a surface element has a leading edge 4, a trailing edge 6, and an engine 8 mounted on the underside near the leading edge 4. For supporting the engine 8, a support structure is used which is not depicted in detail herein. Usually, push rods and brackets are used for the introduction of forces and for providing directional stability. The support structure is covered by an aerodynamic pylon 10 that extends from the engine 8 directly to the underside of the wing in a region of the leading edge 4 and can be considered, like the engine 8 itself, an add-on body.

For reducing the necessary speed for landing or takeoff the aircraft associated with the wing 2, the wing 2 exemplarily comprises slats 12 as high lift devices on the leading edge 4 and additional flaps on the trailing edge, which flaps are not depicted herein. In a region around the engine 8 and the pylon 10, the slat arrangement 12 is interrupted for avoiding a collision between slats 12 and engine 8 or pylon 10. The spanwise leading edge device interruption would also be apparent when the engine 8 is attached to the wing itself. Therefore, the high lift generation in this region may be disturbed due to a discontinuous flow around adjacent end faces 14 of the slats 12.

For improving the high lift generation, it is proposed to use an arrangement of openings 16 in the region covering the adjacent end faces 14, the engine 8 and the pylon 10. This region may extend for up to 20% of the wing span from an engine mounting center line 18 to the left (indicated with measure a) and/or up to 20% from the engine mounting center line 18 to the right (indicated with measure b). Furthermore, the region may extend for up to 30% of the wing root chord from the leading edge 4 to the trailing edge 6 as indicated with measure c.

The openings 16 may be realized as slits or bore holes having a depth or diameter of 0.1 mm-20 mm, wherein the slits may also have a width between 1 mm and 1000 mm and preferably between 10 mm and 100 mm. It is imaginable to use one or more slits that extend over the whole spanwise, i.e. lateral, distance of interest. The slits may exemplarily be oriented spanwise, wherein the direction of extension is substantially parallel to the leading edge 4. It may be possible to use a number of 1-1000 bore holes or 1-300 slits. If a plurality of slits at the same lateral position is used, they may be arranged parallel to each other. Furthermore, a combination of bore holes and slits may be possible as well as the use of a plurality of different dimensions throughout the openings, depending on the local flow characteristics.

Figure 1B:
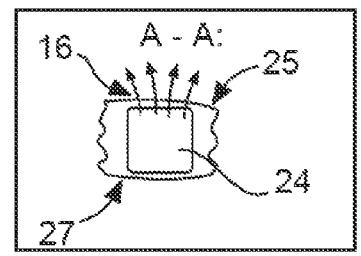
Figure 1B:
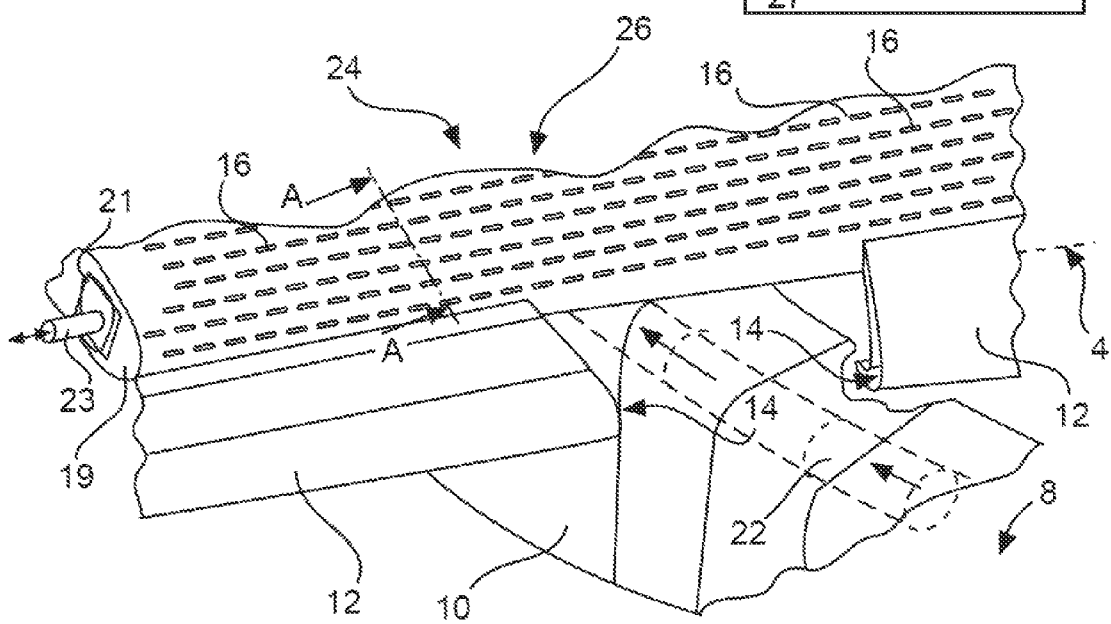

FIG. 1b demonstrates the region of interest in a three-dimensional view. The pylon 10 extends from an engine (not shown in FIG. 1b) to the leading edge 4. Since the slats 12 of the slat arrangement are designed so as to be extended downwards in a high lift state they cannot be deployed from directly above the pylon 10. The resulting gap is further depending on the distance between the engine 8 and the wing as well as on the lateral dimension of the support structure directly under the wing. It is known to use a flap that is extendable from the leading edge 4 over a small region of the pylon 10 to eliminate additional drag in this region.

Instead, according to an embodiment of the invention a predefined fraction of the wingspan adjacent to the engine mounting center line 18 may contain openings 16. This may include a range of up to 20% in inboard direction, up to 20% in outboard direction and into both directions, as explained above. These openings are connected to a conveying device (not shown in FIG. 1b), which conveying device may lead compressed air to the openings 16. For example, there is a bleed air duct 22 running from the engine 8 within the pylon 10 to a manifold 24 (further exemplarily depicted in a sectional view A-A) which resides in a pylon root region 26. By means of this manifold 24, all openings 16 are supplied with bleed air. The manifold 24 may be realised by a chamber consisting of an upper skin 25 of the wing and a lower skin 27 connected to the upper skin under creation of a hollow space. The hollow space may be supplied with compressed air or may be connected with a pressure sink for sucking off air through the openings.

Alternatively, the manifold may be connected to an active air conveying device that provides a source for compressed air or a pressure sink directly in the pylon root region 26. As a further alternative, a line 23 for compressed air and/or for connection with a pressure sink or suction port may be installed in the surface element 2, e.g. in a front spar 21 to which a nose element 19 is connected, as the front spar 21 usually extends over a substantial length of the leading edge 4.

Figure 2A:
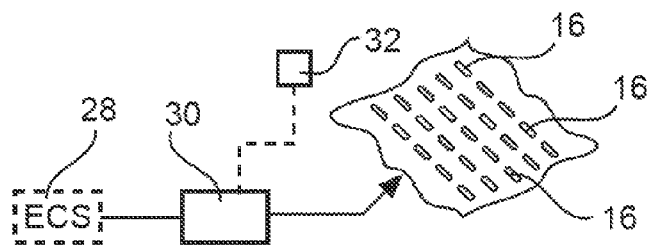
FIGS. 2a to 2f schematically show different conveying devices.

FIG. 2a demonstrates the supply of air to the openings 16 by means of air taken from an environmental control system 28, for example from the pack or a compressed air line. Compressed air is thereby provided to a conveying device 30 which may comprise a valve or other fluidic device that is adapted to switch on or off an air supply. The conveying device 30 may furthermore comprise a manifold, e.g. the manifold 24 shown in FIG. 1b, that provides air to several openings 16 from a single supply line. As an alternative, the manifold may be integrated into the wing structure as explained above.

As the supply of air is only necessary in high lift conditions, it is preferable that the conveying device 30 is connected to a control unit 32, which control unit 32 may furthermore be connected to the flight control computer, a flight management system, or may be realized as a part of the flight control computer or the flight management system or any other electronic means that is essential for the flight control. The connection to the control unit 32 is necessary or advantageous for switching on or off the supply and may also provide the ability to regulate the volume flow for considering the actual air speed and the required air flow.

Figure 2B:
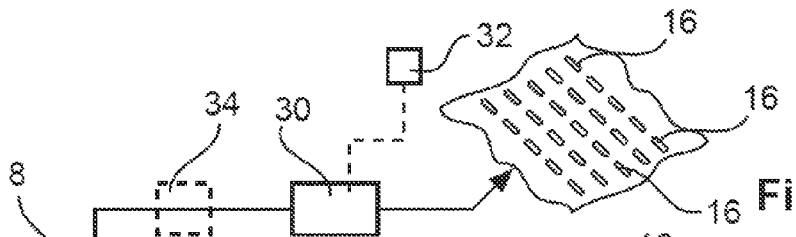

FIG. 2b demonstrates an alternative solution with an aircraft engine 8 that delivers bleed air to the conveying device 30, which conveying device 30 may be the same as in FIG. 2a. As bleed air may comprise a temperature that exceeds the maximum allowable temperature for the opening 16 in the aircraft structure, a cooler or a pre-cooler may be installed up-stream of the conveying device 30. This cooler is depicted with a dotted line 34. Usually, bleed air systems in an aircraft comprise at least one of these coolers 34. As an alternative, an additional bleed air port may be provided for lowering the pressure and temperature of this pressurized air source.

Figure 2C:
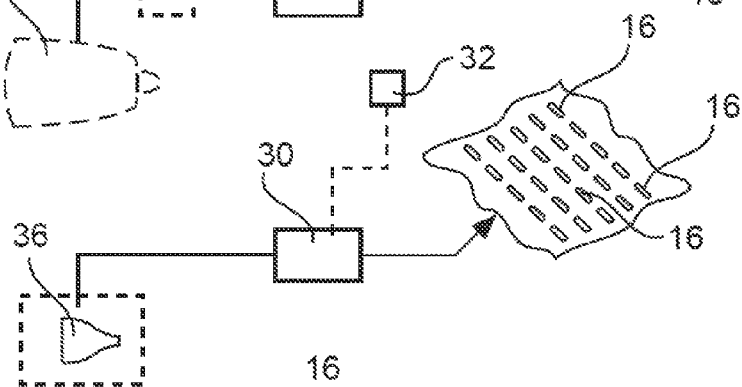

In the case where there is either no bleed air or it is not desired to install air ducts from a component of the environmental control system to the conveying device 30, it may be possible to use a ram air inlet 36 connected to the conveying device 30, as shown in FIG. 2c. The ram air inlet may be installed in or at the pylon 10 in order to prevent longish ram air ducts inside the surface element 2 of the aircraft. Preferably, the ram air inlet 36 is closable by a flap or other means in order to prevent unwanted drag during cruise flight.

Figures 2D, 2E:
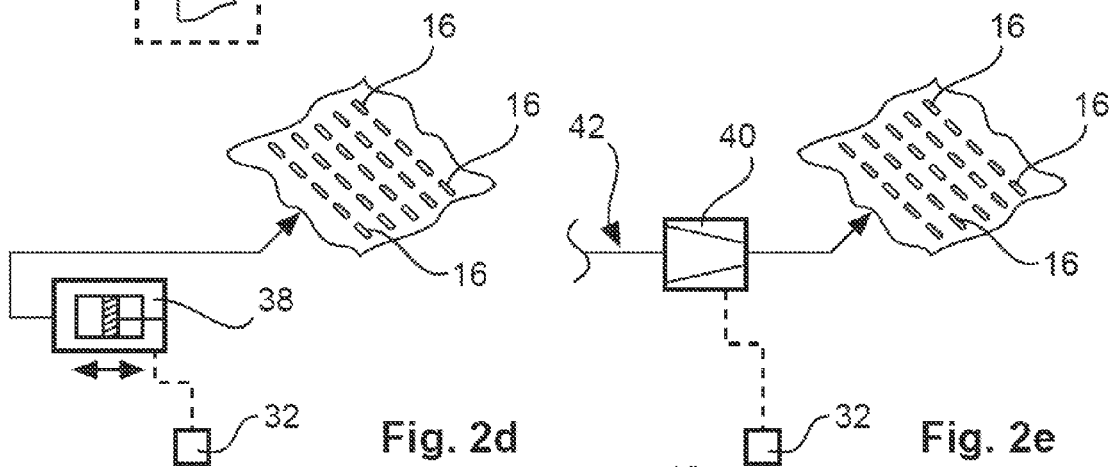

In FIG. 2d, a piston type air conveying device 38 that may be connected to the control unit 32, which conveying device 38 supplies air and draws off air from the openings 16 in an alternating manner is exemplarily shown. As stated further above, alternate apparatuses are possible, such as comprising electromagnetic drivers, piezoelectric drivers and others. Thereby, the necessary flow rate of air can be eliminated completely, as practically no air is conveyed in total. The effect of this kind of air conveying device 38 is the transfer of energy into the local flow field, thereby affecting the separation characteristics and harmonizing the total flow. An advantage lies in the absence of valves or longish air lines. The air conveying device 38 may preferably be driven by a combination of an excentric and an electric motor.

FIG. 2e demonstrates the use of a compressor 40 connected to an air source 42. The compressed air may be supplied to the openings 16, wherein a further valve arrangement may be present, which is not depicted herein.

Figure 2F:
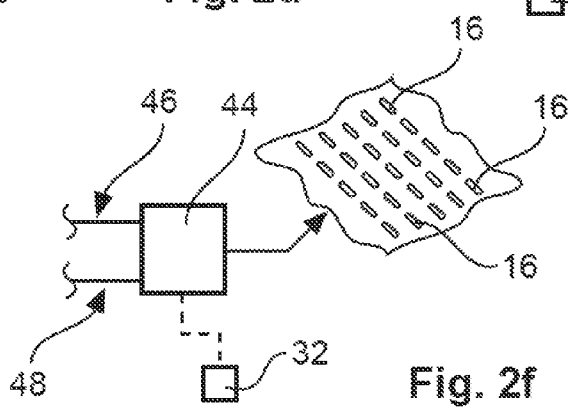

FIG. 2f demonstrates the use of a compressed air line 46 and a low pressure line 48 connected to a conveying device 44 that supplies air to the openings 16 or draws off air from the openings 16. By the connection to the control unit 32 the air conveying device 44 enables an adaption to the actual local flow characteristics.

Figure 3:
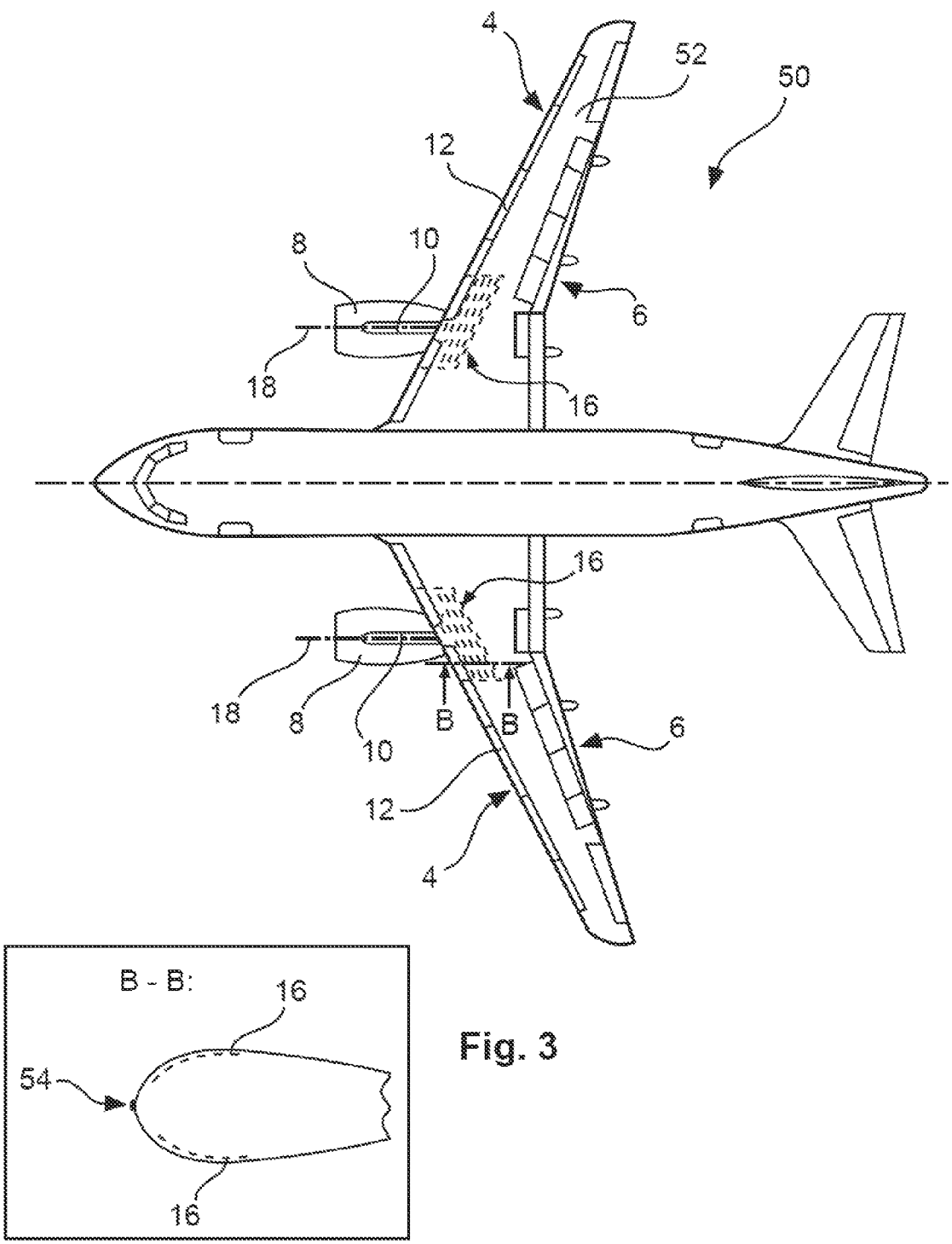
FIG. 3 shows an aircraft with a wing according to the invention.

FIG. 3 shows an aircraft 50 with a wing 52 having a number of openings 16 in a region over a pylon 10. All of the above mentioned alternate arrangements regarding the supply of compressed air or the source of low pressure are usable herein. For the sake of completeness a completely exemplary stagnation point 54 is shown at a front of the profile of the wing surface. As presented above, the location of the openings is not limited to the upper side of the surface element. Therefore, in a sectional view B-B a section of openings 16 at an upper side as well as a section of openings at a lower side of the wing 52 is presented. Again, this figure is not binding, the stagnation point 54 as well as the location of the openings 16 shall be adjusted according to the expected or measured flow characteristics.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft wing comprising:
   a leading edge,
   a high lift device arrangement positioned along the leading edge,
   at least one add-on body comprising an engine positioned in a leading edge region, the engine having an engine mounting center line,
   wherein the high lift device arrangement is interrupted in the region of at least one add-on body for preventing collision with the add-on body,
   wherein the wing comprises an arrangement of openings in a region covering the add-on body, said openings connected to an air conveying device for conveying air through the openings, and wherein the arrangement of openings extends for up to 20% of the wing span to each side of the engine mounting center line.

2. The surface element of claim 1, wherein the arrangement of openings is positioned in a region in the proximity of the region with the highest flow instability in terms of separation tendency on the surface element with extended high lift devices.

3. The surface element of claim 1, wherein the openings are selected from a group of openings, the group consisting of:
   at least one bore hole,
   at least one slit introduced into the surface of the surface element in a direction parallel to the leading edge,
   at least one slit introduced into the surface of the surface element in a direction normal to the leading edge,
   at least one slit introduced into the surface of the surface element in a direction at an angle to the leading edge.

4. The surface element of claim 1, further comprising a front spar; and a nose element attached onto the front spar, wherein the openings extend into the front spar or are connected to an air line in the front spar.

5. The surface element of claim 1, wherein the conveying device is adapted for sucking off air or for blowing out air or for both sucking air off and for blowing out air through the openings.

6. The surface element of claim 1, wherein the conveying device is connected to at least one of a compressed air line and a suction air line and is connectable to the openings in a fluidic manner.

7. The surface element of claim 1, wherein the conveying device is configured as a compressor that is in fluidic connection to the openings or wherein the conveying device is connected to an air sucking device and is connectable to the openings in a fluidic manner.

8. The surface element of claim 1, wherein the conveying device is adapted for blowing out and sucking off air through the openings in an alternating manner.

9. The surface element of claim 1, wherein the arrangement of openings extends for up to 30% of the wing root chord from the leading edge to the trailing edge.

10. An aircraft, comprising a wing, the wing comprising:
    a leading edge,
    a high lift device arrangement positioned along the leading edge,
    at least one add-on body comprising an engine positioned in a leading edge region, the engine having an engine mounting center line,
    wherein the high lift device arrangement is interrupted in the region of at least one add-on body for preventing collision with the add-on body,
    wherein the wing comprises an arrangement of openings in a region covering the add-on body, said openings connected to an air conveying device for conveying air through the openings, and
    wherein the arrangement of openings extends for up to 20% of the wing span to each side of the engine mounting center line.

11. A method for improving high-lift generation of a wing of an aircraft, the method comprising:
    conveying air through an arrangement of openings in a region covering an add-on body positioned in a leading edge region of the wing by an air conveying device when a high lift device arrangement interrupted in the region of at least one add-on body for preventing collision with the add-on body, is extended from the leading edge, the add-on body comprising at least one of an engine having an engine mounting center line,
    wherein the arrangement of openings extends for up to 20% of the wing span to each side of the engine mounting center line.

* * * * *